US006836996B1

(12) United States Patent
Huppert

(10) Patent No.: US 6,836,996 B1
(45) Date of Patent: Jan. 4, 2005

(54) MODULAR WEIGHTED HOOK ASSEMBLY WITH ATTRACTOR RETAINERS

(76) Inventor: Mikel Huppert, 1327 Debra. St., Ellsworth, WI (US) 54011

( * ) Notice: Subject to any disclaimer, the term of this patent is extended or adjusted under 35 U.S.C. 154(b) by 0 days.

(21) Appl. No.: 10/388,693

(22) Filed: Mar. 14, 2003

(51) Int. Cl.⁷ .......................... A01K 83/00; A01K 95/00
(52) U.S. Cl. ...................................... 43/42.39; 43/44.81
(58) Field of Search ............................ 43/42.37, 42.39, 43/44.81

(56) References Cited

U.S. PATENT DOCUMENTS

| | | | | |
|---|---|---|---|---|
| 3,589,052 A | * | 6/1971 | King ........................... | 43/44.88 |
| 3,714,730 A | * | 2/1973 | Lloyd ........................... | 43/17.2 |
| 3,740,803 A | * | 6/1973 | Arteburn .................... | 43/43.12 |
| 3,863,380 A | * | 2/1975 | Purlia .......................... | 43/17.6 |
| 4,114,829 A | * | 9/1978 | Boehler .................. | 242/157 R |
| 4,361,977 A | * | 12/1982 | Lawler ....................... | 43/44.83 |
| 4,914,851 A | * | 4/1990 | Acker ....................... | 43/42.41 |
| 5,001,856 A | * | 3/1991 | Gentry ....................... | 43/42.31 |
| 5,042,191 A | * | 8/1991 | Fett ............................ | 43/44.83 |
| 5,680,726 A | * | 10/1997 | Sassone ..................... | 43/43.16 |
| 5,832,655 A | * | 11/1998 | Crumrine ................... | 43/42.39 |
| 5,890,317 A | * | 4/1999 | Hollomon ................... | 43/44.8 |
| 6,240,672 B1 | * | 6/2001 | Huppert ...................... | 43/44.8 |

* cited by examiner

Primary Examiner—Michael Carone
Assistant Examiner—Bret Hayes
(74) Attorney, Agent, or Firm—DL Tschida

(57) ABSTRACT

A modular hook assembly that includes an adjustable shank mounted weight and retainers that accept artificial attractors, rattles, weights, lights, cyalume sticks or other accessories. A weight member having a longitudinal notch is cast over a slit sleeve that compressively grips the hook shank and permits adjustment of the weight along the shank. A wire formed artificial attractor retainer mounts to the hook eye or other available aperture to secure a variety of molded plastic attractors or live bait to the hook. A second wire formed retainer includes an open-looped section that clips onto the hook. A trailing spiral wound section includes a bore that accepts the head of a rattle chamber, cyalume stick, weight or other accessory screwed into the bore.

19 Claims, 3 Drawing Sheets

MODULAR WEIGHTED HOOK ASSEMBLY WITH ATTRACTOR RETAINERS

BACKGROUND OF THE INVENTION

The present invention relates to fishing hooks and, in particular, to hooks selectively outfitted with a dressing retainer for securing attractors to the hook (e.g. artificial plastic tails, tubes etc. or live bait), and/or a retainer that accepts a rattle, cyalume stick or secondary weight and/or a weight that can be adjustably positioned along the hook shank.

A longstanding problem of fishermen who use plastic lure dressings or attractors (e.g. plastic tails, tubes with filamentary tentacles and other molded artificial baits that mimic the appearance of live bait) is obtaining a secure attachment of the artificial bait to a fishhook. Many attractors attach directly to the hook by threading the hook through the body of the attractor. This attachment subjects the attractors to wear and tear that causes the attractor to rotate, slip and dislodge from the hook. The attractor must therefore be continually attended and repositioned or replaced.

A variety of retainers have been developed to facilitate dressing retention. Some retainers depend from the shank of the hook and some depend from the eye of the hook. Among the former retainers, several retainers provide members that are molded to the hook and have protruding prongs and ridges over which the attractor is threaded and that prevent retraction of the attractor. The shank of the hook can also be formed with burrs, slivers or other barbed protrusions to prevent slippage.

Several of the eye supported retainers provide formed pieces having outer surfaces shaped to discourage retraction. The retainers are either rigidly secured to the hook or are mounted to pivot freely. The attractor is typically threaded onto the hook and the retainer is separately threaded into the attractor to support the attractor at a preferred orientation to the hook. A weedless, antifouling mounting of the attractor is oftentimes obtainable with these retainers. That is, the several attractor attachment points permit a limited obstruction of the gap between the hook eye and tip of the hook barb, which allows the assembly to slide more readily through weeds and other obstructions.

A variety of audible attractors, rattles, lights and cyalume sticks have also been developed that can be mounted to the attractor or attached directly to the hook. Some rattles are constructed to insert into the attractor; others are constructed to attach to the hook or other lure parts with rubber bands, tubing or looped elastomer members. Alone or collectively, the visual attractor dressings and audible attractors can stimulate a prey species of fish to strike the lure.

A variety of hooks also exist that are constructed with permanently located weights. Weights of various sizes (e.g. $\frac{1}{16}$–$\frac{3}{4}$ ounce) and shapes are rigidly cast onto the hook shank at locations that promote a desired hook orientation during retrieval. The variety of weight sizes requires the fisherperson to stock a selection of the various sizes. Some "bottom bouncers" provide weights that are pegged or stopped along a wire form with a rubber band.

The present invention was developed to provide a modular hook assembly. The hook is constructed to support a weight that can be re-positioned along the hook shank to define a desired hook orientation. A formed wire dressing retainer is also provided that depends from the hook eye to support desired plastic attractors. A formed spring wire retainer is also provided that is shaped to support a rattle, weight, and/or cyalume stick. Depending upon a desired arrangement of enhancements, a hook can be accoutered and adapted to complement a broad range of fishing conditions without having to stock a host of special fishing lures.

SUMMARY OF THE INVENTION

It is a primary object of the invention to provide a modularly configured hook assembly capable of supporting artificial visual, audible attractors and/or other accessories from a hook outfitted with an adjustable weight.

It is further object of the invention to provide a hook having a weight member cast to the hook that can be reciprocally adjusted and re-positioned along the shank of the hook.

It is further object of the invention to provide a hook having a notched weight member cast over a sleeve that compressively grips the hook shank and wherein a notch extends the range of weight motion along the hook shank and prevents weight rotation about the hook shank.

It is a further object of the invention to provide a hook having a formed wire retainer secured to pivot at the hook eye or other lure aperture and which retainer mounts in an artificial dressing or attractor body or live bait.

It is further object of the invention to provide a formed spring wire retainer that attaches to a hook and includes a spiral bore wherein a rattle, light, weight or other accessory mounts.

The foregoing objects, advantages and distinctions of the invention are obtained in a modularly constructed, weighted hook assembly that can be configured with singular or combinational arrangements of available attractor and accessory retainers. A shaped weight member is mounted to the shank of the hook and the mounting position of which can be adjusted to vary the orientation of the hook when falling or retrieved. The weight member is cast over a sleeve that compressively grips the hook shank. The weight includes a notch or groove that extends the range of weight motion along the hook shank and prevents weight rotation. A weight having a full-length notch in the weight and the sleeve permit changing the hook weight.

A wire formed artificial attractor retainer mounts to the hook eye to secure a variety of molded plastic attractors or live bait to the hook. A looped section attaches to the eye and a serpentine section penetrates and retains an attractor piece to the hook. Independent penetration with multiple serpentine bends prevents attractor rotation.

A second wire formed accessory retainer is adapted to selectively attach and detach from the hook and retain an audible attractor, cyalume stick or battery/LED light, secondary weight or other compatible accessory to the hook. The retainer includes an open-looped section that clips onto the hook. A trailing spiral wound section includes a bore that accepts the head of a rattle chamber or other appliance (e.g. a weight, cyalume stick or light) that is screwed into the bore.

In still other constructions, the weights and attractor and accessory retainers can be selectively used alone or in desired combinations. The retainers can be secured to a weighted or un-weighted hook and/or a rattle, cyalume stick, secondary weight or other accessory can be secured to a hook without an attractor.

Still other objects, advantages, distinctions and constructions of the invention will become more apparent from the following description with respect to the appended drawings. Similar components and assemblies are referred to in the various drawings with similar alphanumeric reference characters. The description therefore should not be literally construed in limitation of the invention. Rather, the invention should be interpreted within the broad scope of the further appended claims.

DESCRIPTION OF THE PREFERRED EMBODIMENT

Figure 1:
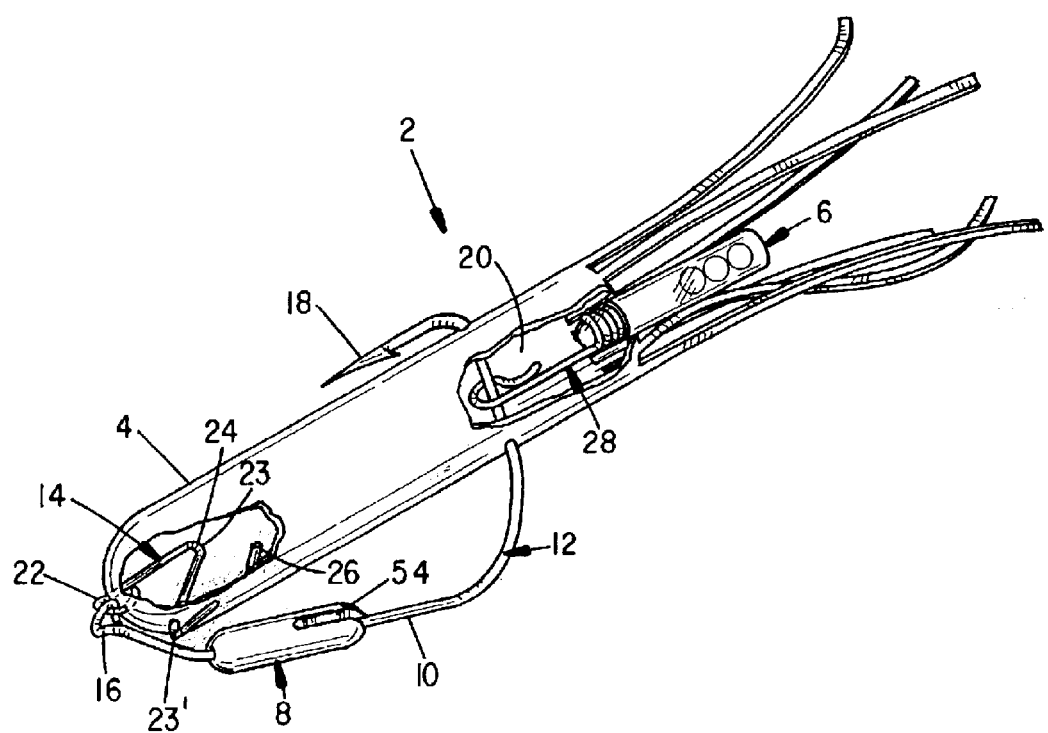
FIG. 1 is a perspective drawing shown in partial cutaway to a hook assembly outfitted with a tube-type attractor, a rattle and an adjustable weight positioned at a forward position.

Referring to FIG. 1, a perspective drawing is shown in partial cutaway to a modular hook assembly 2 of the invention outfitted with a tube-type attractor 4, a detachable rattle assembly 6 and an adjustable weight 8 positioned at a forward position along the shank 10 of a hook 12. The attractor 4 can take a variety of forms, for example, tubes with filamentary tentacles (as shown), plastic worms or other artificial baits that mimic the appearance of live bait and are molded from soft plastics, rubber and the like. The assembly 2 defines an artificial lure that is fished submerged through weeds or wood and/or along selected submerged structure where fish concentrate.

The attractor 4 is secured to the hook 12 with an attractor retainer 14 that is mounted to a hook eye 16. The attractor 4 is separately secured to the hook barb 18. The barb 18 can either be exposed (as shown) or mount inside a hollow bore 20 of the tube attractor 4.

The retainer 14 is substantially embedded into the soft material of the attractor 4 and is formed to prevent the attractor 4 from rotating or withdrawing. With the barb 18 concealed in the attractor 4, the retainer 14 and attractor 4 create a weed less presentation that prevents weeds and other water borne materials from collecting in the gap between the barb 18 and shank 10. The attractor material is sufficiently soft such that the barb 18 can pierce the attractor 4 and penetrate a fish's mouth, when the lure 2 is struck by a fish.

The retainer 14 is constructed of a metal wire that is shaped to provide a closed or open-looped section 22 that attaches to the eye 16. A serpentine section 24 depends from the section 22 and includes convoluted bends 23 and 23' that resist withdrawal or rotation of the attractor 4. A distal tip 26 is bent to facilitate penetration of the attractor 4.

The section 24 exhibits a "Z" shape, although can be bent to a variety of other planar or 3-dimensional shapes, including a spiral. The looped section 22 can be bent to provide any shape that accommodates a detachable mounting of the retainer 14 to the hook eye 16 or sundry other apertures or eyelets at a lure (e.g. a split ring or spinner blade or lure body) with which the retainer 14 might be used. The retainer 14 can also be used to secure live bait to the hook 12.

Figure 2:
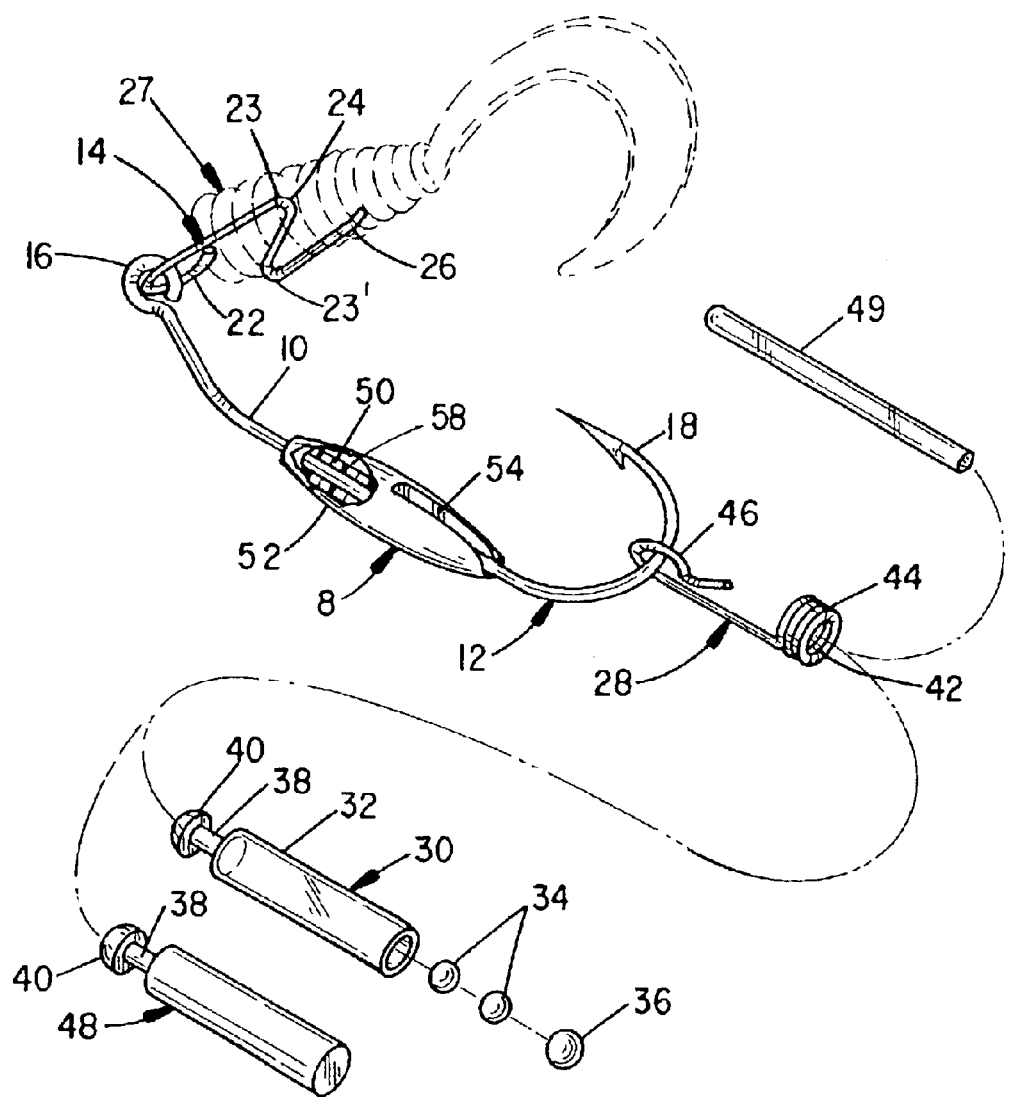
FIG. 2 is a perspective drawing shown in exploded assembly to a hook assembly outfitted with a formed wire attractor retainer, a formed wire rattle or weight retainer and an adjustable weight, shown in cross-section, positioned at a central location along the hook shank.

With additional attention to FIG. 2, which depicts a curly tail attractor 27 in dashed line, the rattle assembly 6 is separately attached to the hook 12 and trails from the interior of the bore 20. The assembly 6 comprises a retainer piece 28 and a purchased rattle 30. The rattle 30 includes a rattle housing 32 that contains a pair of balls 34 that are secured within the housing 32 by an end ball 36. A stem piece 38 projects from the housing 32 to a head 40. The head 40 screws into the bore 42 of a spiral wound section 44 of the retainer 28 and is held in place by the compressive force exerted by the windings 44.

An open-loop section 46 of the retainer 28 snap mounts over the barb 18 and is sized to freely move along the barb 18 such that the rattles 34 can move within the housing 32 with movement of the lure 2. The looped section 46 can also mount to the eye 16 or any other available aperture at a lure with which the retainer 28 might be used. The looped section 46, like the looped section 22, can be constructed to any desired shape that provides a secure mounting.

A secondary weight 48 or a CYALUME® cyalume stick 49, battery/LED light, among other lure accessories, can also be mounted to the section 28. Any such accessory should have a headpiece 40 or body shape that is compatible for insertion into and retention by the wound section 44. One or more retainers 28 and rattles 30, CYALUME® sticks 49, weights 48 or other accessories can be mounted to a lure.

Figure 4:
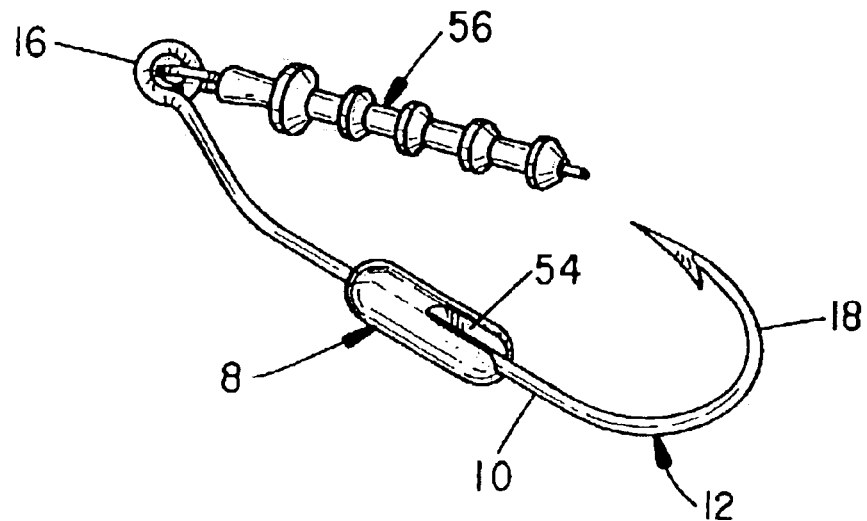
FIG. 4 is a perspective drawing of a hook assembly outfitted with a ribbed attractor retainer and an adjustable weight positioned at a central position along the hook shank.
Figure 3:
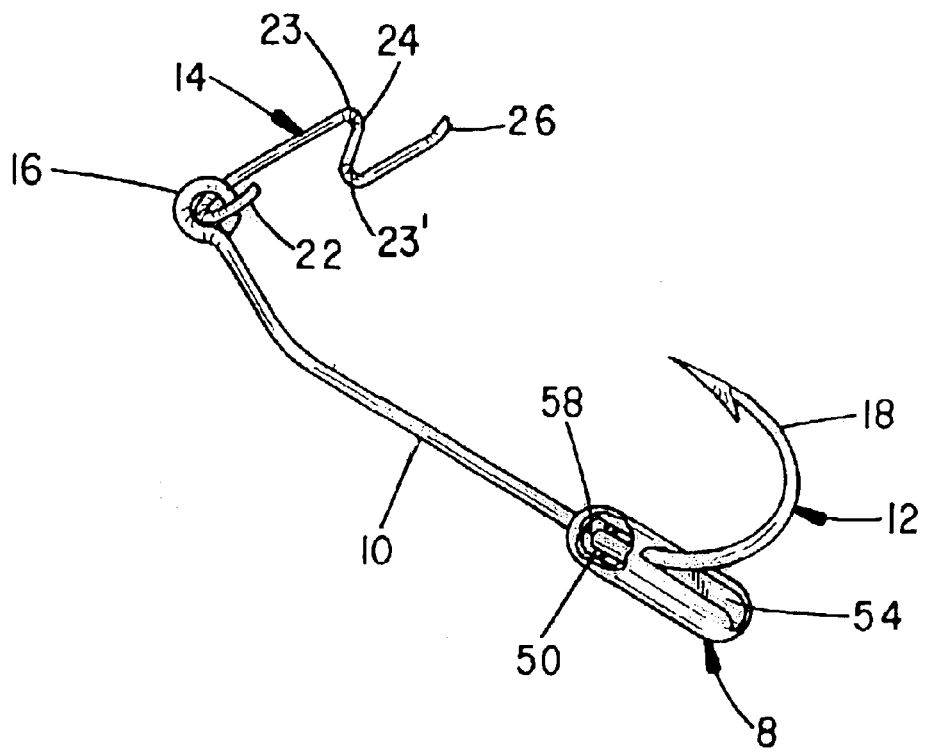
FIG. 3 is a perspective drawing of a hook assembly outfitted with a formed wire attractor retainer and an adjustable weight positioned at an aft most position along the hook shank.

With additional attention to FIGS. 3 and 4, positioned along the shank 10 of the hook is the sliding weight 8. The size (e.g. 1/16 to 3/4 ounce) and shape (e.g. ovaloid, ellipsoid, or spheroid, among other shapes, and may include wings or flat surfaces) of the weight 8 can be varied to accommodate the hook 12 and application. The weight 8 is permanently cast to the hook 12 over a silicone sleeve 50, which is shown in cross section at FIGS. 2 and 3. A bore 52 of the sleeve 50 is sized to mate with and compressively grip the hook shank 10. The sleeve 50 typically includes a longitudinal slit 58 to facilitate mounting the sleeve 50 to the hook 12, prior to casting the weight 8.

The sleeve 50 permits the weight 8 to be moved to and fro along the shank 10 to adjust the hydrodynamics of the lure 2. Several different mounting positions of the weight 8 are shown in FIGS. 3 and 4. The adjustment of the weight 8 controls the rate of fall and/or causes the weight 8 to act like a keel to vary the angle of the lure 2 when retrieved. The weight 8 can be adjusted to provide a "wobble" effect during active retrieval with a reel or a gliding effect such as when jigged. The sleeve 50 can be constructed of a variety of materials (e.g. silicone or rubber) to a variety of shapes, provided a compressive and movable attachment is obtained with the shank 10.

The weight 8 might also be cast directly to the shank 10 between a pair of adjustable rubber sleeves or O'rings or may provide an opening to receive a peg to fix the location of the weight at the shank 10. A rubber insert that lies parallel to the shank might also be cast into the weight 8 to facilitate a restricted movement of the weight 8.

A longitudinal notch, kerf or groove 54 is let into the weight 8. The notch 54 can be rotated down when the weight 8 is located at the forward and middle sections of the shank 10. When the notch 54 is rotated up, as shown in FIG. 3, the weight 8 can be extended to an aft most position to slow the rate of fall. The length of the notch 54 can be varied as desired. The notch 54 might also extend the full length of the weight (as shown in dashed line at FIG. 4) and align with the full-length longitudinal slit 58 in the sleeve 50. A weight 8 having a full-length notch 54 and slit 58 allows the weight 8 to be changed. Alternatively, the retainer 28 can be used to secure an additional weight 48 to a lure.

FIG. 4 depicts a central mounting of the weight 8. It also depicts an alternative attractor retainer 56 secured to the eye 16 and which retainer is described in U.S. Pat. No. 6,405,477. The retainer 56 can be used in lieu of the retainer 14.

While the invention has been described with respect to a preferred combinational assembly and considered improvements or alternatives thereto, still other assemblies and rigging arrangements may be suggested to those skilled in the art. It is also to be appreciated that the foregoing retainers 14, 28 and 56, attractors 4, weights 8 and 48 and cyalume stick 49 can be used singularly or can be arranged in different combinations to provide a variety of improved lures. The foregoing description should therefore be construed to include all those embodiments within the spirit and scope of the following claims.

What is claimed is:

1. A hook assembly comprising:
    a) a fish hook having a shank, an eye and a barbed end;
    b) a tubular sleeve having a bore mounted over said shank and wherein said bore is formed to constantly compressively grip said shank; and
    c) a weight member mounted over said sleeve and wherein said sleeve and said weight member can be selectively manipulated along said shank and such that said sleeve and said weight member are self-restrained to said shank once manipulated to any selected location along said shank.

2. The hook assembly as set forth in claim 1 wherein said weight member includes a longitudinal slot and wherein said slot can be manipulated relative to a bent portion of said shank to prevent rotation of said weight member.

3. The hook assembly as set forth in claim 1 including an artificial dressing and a wire formed retainer having a looped section mounted to said eye and a depending serpentine section that extends from said hook and mounts inside said dressing member to prevent dislodgement of said dressing.

4. The hook assembly as set forth in claim 3 wherein said serpentine section exhibits a "Z" shape.

5. The hook assembly as set forth in claim 1 including a rattle having a head piece and a wire formed retainer having a looped section that mounts to said hook and a depending wound section having a bore that extends from said hook and wherein said head piece is mounted in said bore.

6. The hook assembly as set forth in claim 1 including a second weight member having a head piece and further including a wire formed retainer having a looped section that mounts to said hook and a depending wound section having a bore and wherein said head piece is mounted in said bore.

7. The hook assembly as set forth in claim 1 including an illumination source and further including a wire formed retainer having a looped section that mounts to said hook and a depending wound section having a bore and wherein said illumination source is mounted in said bore.

8. The hook assembly as set forth in claim 1 wherein said sleeve includes a longitudinal slit.

9. The hook assembly as set forth in claim 8 wherein said weight member includes a full length longitudinal slot aligned with said longitudinal slit of said sleeve, whereby said weight member can be attached and detached from said hook upon inserting and withdrawing said shank from said aligned longitudinal slot and longitudinal slit.

10. A hook assembly comprising:
    a) a fish hook having a shank, an eye and a barbed end;
    b) a sleeve having a bore mounted over said shank and wherein said bore is formed to constantly compressively grip said shank;
    c) a weight member mounted over said sleeve and wherein said sleeve and said weight member can be selectively manipulated along said shank and such that said sleeve and said weight member are self-restrained to said shank once manipulated to any selected location along said shank; and
    d) a wire formed retainer having a looped section mounted to said hook and a depending serpentine section and wherein said serpentine section is formed to fasten to a lure dressing.

11. The hook assembly as set forth in claim 10 wherein said sleeve includes a longitudinal slit.

12. The hook assembly as set forth in claim 10 including a rattle having a housing and wherein said serpentine section comprises a winding having a bore and wherein said housing is mounted in said bore.

13. The hook assembly as set forth in claim 10 including a second weight member and wherein said serpentine section comprises a winding having a bore and wherein said second weight member is mounted in said bore.

14. The hook assembly as set forth in claim 10 wherein said weight member includes a longitudinal slot and wherein said slot can be manipulated to prevent rotation of said weight relative to a bent portion of said hook.

15. The hook assembly as set forth in claim 10 wherein said serpentine section comprises a spiral wound portion of said retainer having a bore and wherein an illuminating member is mounted in said bore.

16. The hook assembly as set forth in claim 15 wherein said illuminating member comprises a chemical stick.

17. The hook assembly comprising:
    a) a fish hook having a shank, an eye, a bent portion and a barbed end; and
    b) a sleeve piece having a bore mounted over said shank and a longitudinal slit communicating with said bore and wherein said bore is formed to constantly compressively grip said shank;
    c) a weight piece mounted over said sleeve, wherein said weight piece includes a longitudinal slot and wherein said sleeve and weight piece can be selectively manipulated along said shank and such that said sleeve and weight member are self-restrained to said shank once manipulated to any selected location along said shank and such that rotation of said weight piece is limited upon locating said bent portion in said slot.

18. The hook assembly as set forth in claim 17 including a wire formed retainer having a looped section mounted to said hook and a depending serpentine section and wherein said serpentine section is formed to fasten to and dangle a lure dressing from said hook.

19. The hook assembly as set forth in claim 17 wherein said lure dressing is selected from a class comprising artificial plastic baits, weights, rattles, and light emitting members.

* * * * *